United States Patent [19]

Sutter, Jr.

[11] 4,251,781

[45] Feb. 17, 1981

[54] ELECTRIC DISCHARGE-EXCITED FLOWING GAS LASER WITH DISCHARGE CONFINEMENT SHIELD

[75] Inventor: Leroy V. Sutter, Jr., Culver City, Calif.

[73] Assignee: Hughes Aircraft Company, Culver City, Calif.

[21] Appl. No.: 5,119

[22] Filed: Jan. 22, 1979

[51] Int. Cl.³ .............................................. H01S 3/097
[52] U.S. Cl. ........................ 331/94.5 PE; 331/94.5 D
[58] Field of Search .................. 331/94.5 PE, 94.5 G, 331/94.5 D, 94.5 T

[56] References Cited

U.S. PATENT DOCUMENTS

| 3,886,481 | 5/1975 | Foster et al. | 331/94.5 T |
|---|---|---|---|
| 3,962,656 | 6/1976 | Peressini | 331/94.5 PE |
| 3,970,962 | 7/1976 | Peressini et al. | 331/94.5 PE |
| 4,096,449 | 6/1978 | Foster | 331/94.5 PE |

*Primary Examiner*—James W. Davie
*Attorney, Agent, or Firm*—Paul M. Coble; William H. MacAllister

[57] ABSTRACT

An electrically excited laser is disclosed wherein a laser gas is caused to flow along a gas flow channel and through an excitation region thereof in which an electric discharge is established between an anode and a cathode disposed substantially flush with respective opposing walls of the gas flow channel, and wherein an electron beam is introduced into the excitation region along a direction parallel to the discharge direction. A shield arrangement is provided immediately downstream from the laser excitation region to confine the discharge to the region directly between the anode and the cathode. The shield arrangement includes a plurality of planar electrically insulating rack members disposed across the gas flow channel in respective spaced planes parallel to both the direction of the discharge and the gas flow direction, and a plurality of planar shelf members carried by the rack members and oriented with their board surfaces transverse to the rack members. The shelf members are tightly fit within grooves in the rack members and are held in place by the gas flow pressure without any bonding or cementing.

17 Claims, 2 Drawing Figures

ELECTRIC DISCHARGE-EXCITED FLOWING GAS LASER WITH DISCHARGE CONFINEMENT SHIELD

The invention described herein was made in the course of or under a contract or subcontract thereunder with the United States Government.

BACKGROUND OF THE INVENTION

1. Field of the Invention

This invention relates to lasers, and more particularly it relates to flowing gas lasers excited by means of an electric discharge transverse to the gas flow direction.

2. Description of the Prior Art Including Prior Art Statement

Exemplary high power, cw, electrically excited flowing gas lasers are disclosed in U.S. Pat. No. 3,962,656 to E. R. Peressini and in U.S. Pat. No. 3,970,962 to E. R. Peressini et al, both patents being assigned to the assignee of the present invention. In lasers of this type, the laser gas flows through an excitation region where it is excited to a condition of population inversion by an electric discharge controlled by an electron beam introduced into the excitation region from an adjacent electron gun. The discharge is established between a pair of electrodes disposed on opposite sides of the gas flow channel at the excitation region. The electrons in the electron beam and in the discharge current travel in a direction transverse to the gas flow direction.

During operation of discharge-excited lasers of the aforementioned type, electrical streamers formed in the discharge sometimes are carried by the flowing laser gas slightly downstream from the region between the discharge electrodes. Thus, the discharge is caused to spread out, and some of the input power is deposited into the flowing laser gas downstream from the region where the laser beam is generated.

SUMMARY OF THE INVENTION

It is an object of the present invention to provide an electric discharge-excited flowing gas laser having an arrangement for confining the laser-exciting discharge to the desired laser excitation region, thereby making more effective utilization of input power and improving discharge stability.

It is a further object of the invention to provide an electrically excited flowing gas laser of high operating efficiency and large optical gain.

It is still another object of the invention to provide a simple, reliable and inexpensive discharge-confining arrangement for an electrically excited flowing gas laser, and which arrangement also is designed to minimize thermo-mechanical stress.

In a laser according to the invention, a laser gas is caused to flow through an excitation region in which an electric discharge is established along a direction transverse to the direction of gas flow and into which an electron beam is introduced along such direction transverse to the gas flow direction. In accordance with the invention, a shield arrangement is disposed immediately downstream from the laser excitation region for preventing the discharge from spreading along the gas flow path downstream from the excitation region. The shield arrangement includes at least one plate-shaped member disposed in the path of the flowing laser gas immediately downstream from the excitation region and oriented with its broad surfaces transverse to the discharge direction.

Additional objects, advantages and characteristic features of the invention will become apparent from the following detailed description of a preferred embodiment of the invention when considered in conjunction with the accompanying drawings.

DESCRIPTION OF A PREFERRED EMBODIMENT

Figure 1:
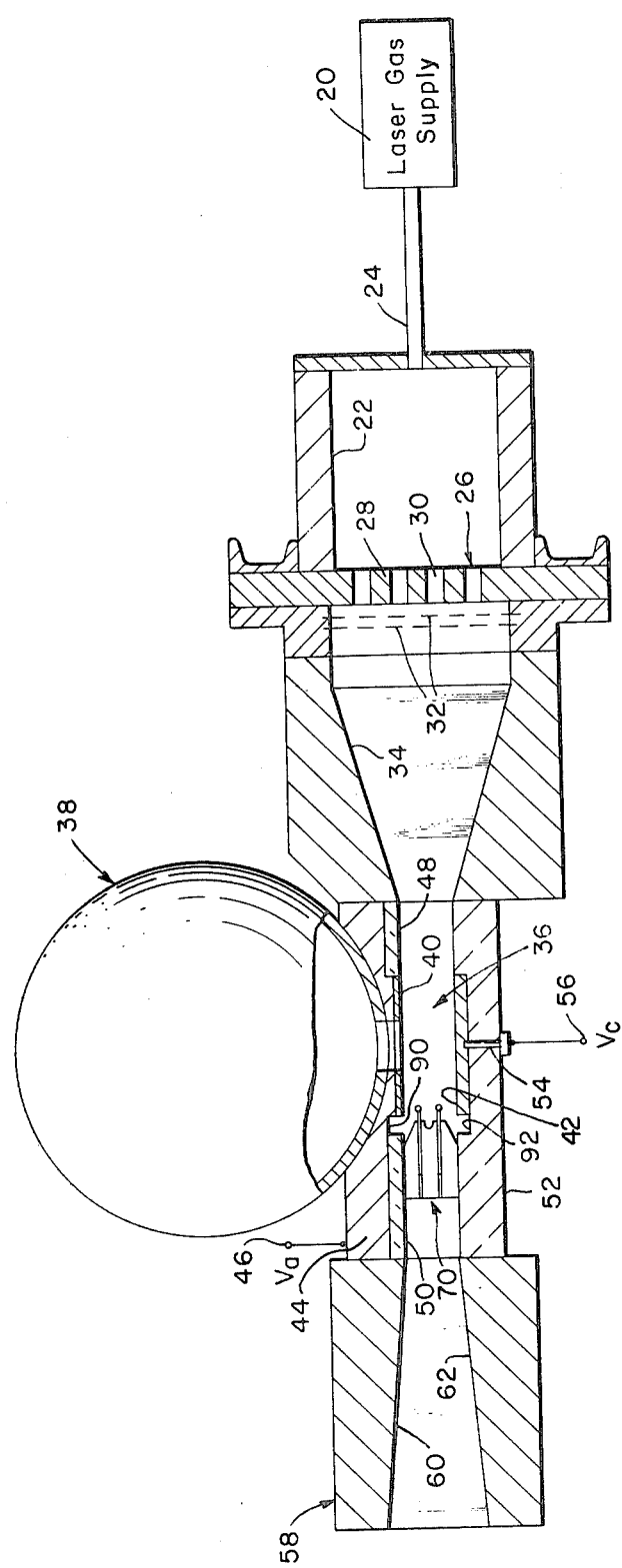
FIG. 1 is a longitudinal sectional view, partly in schematic form, illustrating an electrically excited flowing gas laser according to the invention.

Referring to FIG. 1 with greater particularity, there is shown a laser gas supply 20 which contains a desired laser gas at high pressure and from which the laser gas is fed to a plenum chamber 22 via a supply line 24. An example of a specific laser gas which may be employed is a mixture of helium, nitrogen and carbon dioxide in a volume ratio of approximately 8:7:1. However, it should be understood that other gases and gas mixture ratios also may be employed.

Disposed across the downstream end of the plenum chamber 22 is a perforated plate nozzle 26 which accelerates the high-pressure laser gas stored in the plenum chamber 22 into a high-velocity flowing gas stream. The nozzle 26 may consist of a metal plate 28 provided with a plurality of cylindrical bores 30 as is well known in the art. Disposed across the gas flow path slightly downstream from the nozzle 26 are a plurality of turbulence damping screens 32 to insure that any turbulence introduced by the nozzle 26 will be removed before the laser gas enters the laser excitation region. Provided between the region of the damping screens 32 and the laser excitation region is a gas flow channel 34 having walls which are tapered inwardly in the direction of gas flow to further accelerate the gas to the desired velocity in the exitation region while minimizing the thickness of boundary layers which form in the flowing gas adjacent to the channel walls.

In excitation region 36, the laser gas is excited to a condition of population inversion by a transverse cw electric discharge controlled by an electron beam generated by an electron gun 38 disposed adjacent to the excitation region 36. The discharge is established between an anode 40 in the form of a foil window for the electron gun 38 disposed above the excitation region 36 and a cathode 42 disposed below the region 36. The anode window 40 enables electrons from the electron gun 38 to enter the excitation region 36 with the desired velocity while at the same time allowing the appropriate pressure differential to be maintained between the region 36 and the interior of the electron gun 38.

The anode 40 may be mounted on an electrically conductive extension member 44 connected to the housing of the electron gun 38. The extension member 44 may be electrically connected to a power supply terminal 46 which furnishes a desired dc operating voltage $V_a$ (which may be ground, for example) for the anode 40. Electrically insulating channel wall members 48 and 50 having respective surfaces which lie flush with the exposed surface of the anode 40 are disposed at respective locations upstream and downstream from the anode 40 on the electron gun side of the exitation region 36.

The cathode 42 is mounted in an indentation in an electrically insulating channel wall member 52 disposed on the opposite side of the excitation region 36 from the anode 40. Electrical connection to the cathode 42 may be afforded by means of an electrically conductive pin 54 extending through the insulating member 52 into contact with the cathode 42. Pin 54, in turn, may be electrically connected to a power supply terminal 56 which furnishes a desired dc operating voltage $V_c$ for the cathode 42.

In order to enable the generation of a laser beam along an optical axis perpendicular to both the gas flow and discharge directions, i.e., along an axis perpendicular to the plane of FIG. 1, an optical resonator may be provided along such axis consisting of a pair of aligned mirrors (not shown) disposed beyond opposite ends of the excitation region 36 along the optical axis.

In order to condition the laser gas such that the desired gas flow velocity and gas pressure are achieved at the downstream end of the excitation region 36, a diffuser 58 is provided downstream from the excitation region 36. The diffuser 58 has a pair of diverging side walls 60 and 62 along the gas flow direction to form a divergent duct which decelerates and compresses the flowing laser gas after it leaves the excitation region 36.

The various components heretofore described for the laser of FIG. 1 are all conventional and well known in the art. For further details concerning these elements, reference may be made to the aforecited U.S. Pat. Nos. 3,962,656 and 3,970,962.

As was indicated above, during operation of the aforedescribed laser, electrical streamers formed in the laser-exciting discharge in the region 36 have a tendency to be carried by the flowing laser gas slightly downstream from the region directly between the anode 40 and the cathode 42. This results in a spreading of the discharge and the deposit of some input power into the flowing laser gas downstream from the region 40 where the laser beam is generated.

Figure 2:
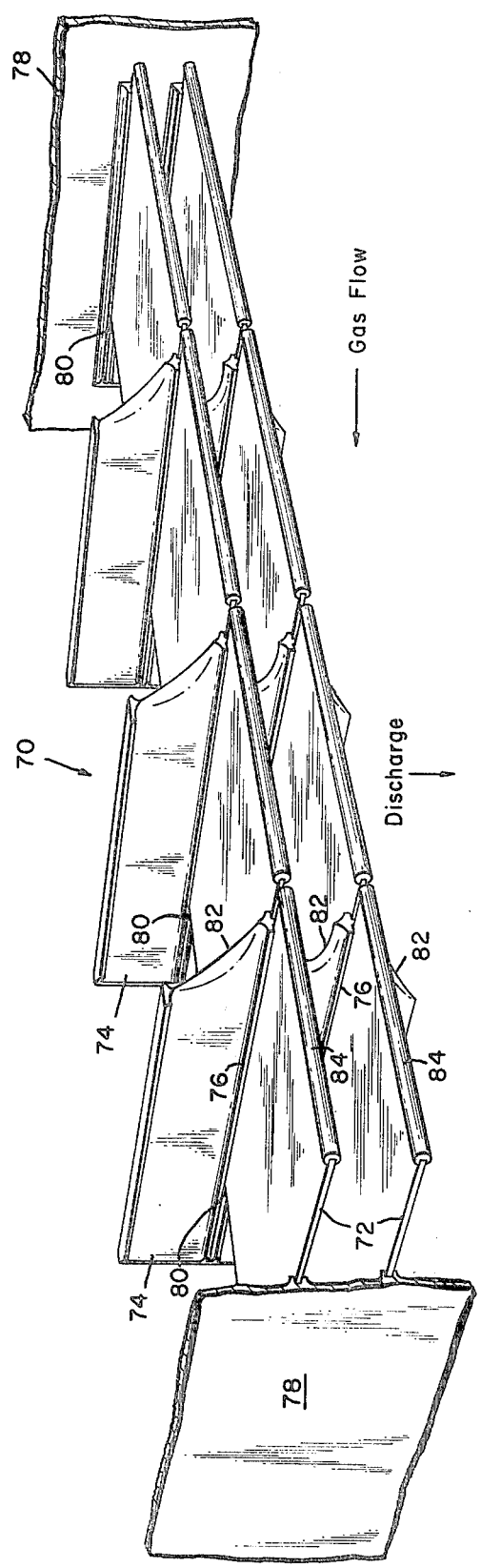
FIG. 2 is an enlarged perspective view of a discharge-confining arrangement according to the invention as used in the laser of FIG. 1.

In accordance with the present invention, a shield arrangement 70, illustrated in detail in FIG. 2, is provided immediately downstream from the laser excitation region 36 to confine the discharge to the region directly between the anode 40 and the cathode 42.

As shown in FIG. 2, the shield arrangement 70 includes a plurality of planar shelf members 72 disposed with their broad surfaces parallel to the direction of gas flow and perpendicular to the direction of the discharge current, i.e., parallel to the anode 40 and the cathode 42. The shelf members 72 preferably are of metal, for example, stainless steel, although electrically insulating and semiconductor materials may be employed instead. Exemplary insulating materials are ceramic materials such as alumina and beryllia. The shelf members 72 are carried by a plurality of planar electrically insulating rack members 74 disposed parallel to the direction of gas flow and perpendicular to the shelf members 72. The rack members 74 preferably are made of a ceramic material such as alumina or beryllia, although other materials are also suitable and may be employed instead. Moreover, although two rows of four aligned shelf members 74 are shown supported by three rack members 74 in the specific exemplary arrangement of FIG. 2, other numbers of shelf and rack members are also suitable depending upon the size of the gas flow channel and power considerations for the discharge.

The shelf members 72 are supported by mounting their side edges in grooves 76 in the side surfaces of the rack members 74 (or in a side wall 78 of the gas flow channel in the case of the end shelf members 72). Stops 80 are provided in the respective grooves 76 near their downstream ends to limit downstream movement of the shelf members 72. The shelf members 72 are tightly slide-fit within the grooves 80 and are held in place by the gas flow pressure without any bonding or cementing.

As shown in FIG. 2, the front portions of the shelf members 72 project beyond the front portions of the rack members 74 in an upstream direction, while the rear ends of the shelf members 72 terminate upstream from the downstream ends of the rack members 74. Moreover, the upstream edges of the rack members 74 preferably define aerodynamically tapered portions 82 extending in an upstream direction adjacent to the shelf members 72 to prevent stagnation of the gas flow past the members 72 and 74.

When the shelf members 72 are non-metallic, a metal rod 84 should be mounted on the upstream edge of each shelf member 72 to prevent overheating and otherwise protect the shelf members 72 from damage due to the discharge. The rods 84 should be of a material having a high thermal conductivity, a high melting temperature, and high resistance to oxidation. Specific exemplary materials which may be employed for the rods 84 are platinum and copper. Each rod 84 has an elongated slot therein which tightly fits over the upstream edge of the shelf member 72 on which it is mounted.

In addition, when a shield arrangement according to the invention is employed in a closed cycle gas flow system in which the laser gas is recirculated, a further improvement in long term power stability may be achieved by coating the broad surfaces of the shelf members 72 with a catalytic converting material such as platinum or platinum compounds. Such a material converts unwanted by-products of the discharge, for example carbon monoxide and nitrous oxides, back to the initial gas constituents, for example carbon dioxide and nitrogen. Such unwanted by-products could otherwise gradually reduce the discharge power level by removing discharge electrons by molecular attachment.

Referring again to FIG. 1, a further feature of the invention includes the provision of opposing elongated recesses 90 and 92 in the facing top and bottom walls of the gas flow channel at the excitation region 36 immediately downstream from the anode 40 and the cathode 42, respectively. The recesses 90 and 92 are located just downstream from the upstream extremety of the shield arrangement 70 and extend longitudinally in a direction perpendicular to both the direction of the discharge and the gas flow direction, i.e., in a direction perpendicular to the plane of FIG. 1. The recesses 90 and 92 assist in terminating the extent of the discharge by preventing hot spots at the downstream edges of the anode 40 and the cathode 42 from forming streamers. Moreover, as the plasma in the laser excitation region 36 enters the recesses 90 and 92, it provides a gradual transition from the high electrical conductivity material of the anode 40 and the cathode 42 to the insulating material of the walls 50 and 52 downstream from the anode 40 and the cathode 42.

In the operation of the discharge-confining shield arrangement 70, when an electric discharge is established in the excitation region 36, the shelf members 72 block the passage of electric current across the gas flow path in the region of the arrangement 70. A charge distribution accumulates which forces the electric fields around the upstream edges of the shelf members 72. This constrains the flow of discharge current into the region upstream from the arrangement 70, i.e., the region directly between the anode 40 and the cathode 42.

As a result of the aforementioned confining of the discharge to the region where the laser beam is generated, more effective utilization of input power is achieved, resulting in a laser of increased operating effeciency and higher optical gain. At the same time, arcing is reduced and discharge stability is improved. In addition, since the various components of the shield arrangement 70 are held in place mechanically without permanent bonding, thermo-mechanical stress is minimized, and at the same time, in the event an individual part of the arrangement 70 becomes damaged during operation, ready replacement of that part is facilitated.

Although the present invention has been shown and described with reference to a particular embodiment, nevertheless, various changes and modifications which are obvious to a person skilled in the art to which the invention pertains are deemed to lie within the spirit, scope and contemplation of the invention.

What is claimed is:

1. In an electrically excited laser wherein a laser gas is caused to flow along a gas flow channel and through an excitation region of said channel in which an electric discharge is established along a direction transverse to the direction of gas flow and into which an electron beam is introduced along said direction transverse to the direction of gas flow, the improvement comprising:
   discharge confining means disposed across said gas flow channel in the path of the flowing laser gas adjacent to the downstream end of said excitation region and including at least one plate-shaped member having an upstream edge located approximately at the downstream end of said excitation region, said plate-shaped member being oriented with its broad surfaces transverse to the direction of said discharge, for preventing said discharge from spreading along said gas flow path downstream from said excitation region.

2. The improvement according to claim 1 wherein a coating of a material including platinum is provided on at least a portion of said plate-shaped member.

3. The improvement according to claim 1 wherein said plate-shaped member is of metal.

4. The improvement according to claim 1 wherein said plate-shaped member is of non-metallic material, and further including a metal rod mounted on the upstream edge of said plate-shaped member along said gas flow direction.

5. The improvement according to claim 4 wherein said metal rod has an elongated slot therein tightly fitting over the upstream edge of said plate-shaped member.

6. In an electrically excited laser wherein a laser gas is caused to flow along a gas flow channel and through an excitation region of said channel in which an electric discharge is established along a direction transverse to the direction of gas flow and into which an electron beam is introduced along said direction transverse to the direction of gas flow, the improvement comprising:
   discharge confining means disposed across said gas flow channel in the path of the flowing laser gas adjacent to the downstream end of said excitation region and including a plurality of parallel plate-shaped members disposed in respective planes transverse to the direction of said discharge and spaced from one another along the direction of said discharge for preventing said discharge from spreading along said gas flow path downstream from said excitation region, said plate-shaped members having their respective upstream edges located approximately at the downstream end of said excitation region.

7. In an electrically excited laser wherein a laser gas is caused to flow along a gas flow channel and through an excitation region of said channel in which an electric discharge is established between first and second opposing electrodes disposed substantially flush with respective first and second opposing walls of said gas flow channel, and wherein an electron beam is introduced into said excitation region along a direction parallel to the direction of said discharge, the improvement comprising:
   discharge confining means disposed across said gas flow channel in the path of the flowing laser gas adjacent to the downstream end of the region between said first and second electrodes and including at least one plated-shaped member having an upstream edge located approximately at the downstream end of said region between said electrodes, said plate-shaped member being oriented with its broad surfaces parallel to said electrodes, for preventing said discharge from spreading along said gas flow path downstream from said region between said electrodes; and
   said first and second walls of said gas flow channel defining respective first and second elongated recesses adjacent to the downstream ends of said first and second electrodes, respectively, said recesses extending along a direction transverse to both the direction of said discharge and the gas flow direction.

8. In an electrically excited laser wherein a laser gas is caused to flow along a gas flow channel and through an excitation region of said channel in which an electric discharge is established along a direction transverse to the direction of gas flow, the improvement comprising:
   a plurality of planar electrically insulating rack members disposed across said gas flow channel adjacent to the downstream end of said excitation region in respective spaced planes parallel to both the direction of said discharge and the gas flow direction, and a plurality of planar electrically insulating shelf members carried by said rack members and oriented with their broad surfaces transverse to said rack members, said plurality of shelf members extending across said gas flow channel and each of said shelf members having its upstream edge located approximately at the downstream end of said excitation region.

9. The improvement according to claim 8 wherein a coating of a material including platinum is provided on at least a portion of at least one of said shelf members.

10. The improvement according to claim 8 wherein each said shelf member is of metal.

11. The improvement according to claim 8 wherein said rack members and said shelf members are of ceramic material, and further including a metal rod mounted on the upstream edge of each said shelf member along said gas flow direction.

12. The improvement according to claim 11 wherein each said metal rod has an elongated slot therein tightly fitting over the upstream edge of the shelf member on which it is mounted.

13. The improvement according to claim 8 wherein said shelf members project beyond said rack members in an upstream direction along said gas flow channel.

14. The improvement according to claim 8 wherein said rack members define aerodynamically tapered portions extending in an upstream direction along said gas flow channel adjacent to said shelf members.

15. The improvement according to claim 8 wherein the facing surfaces of adjacent ones of said rack members define a plurality of pairs of aligned grooves extending along the gas flow direction, and said shelf members are held in tightly fitting relationship in respective ones of said pair of aligned grooves.

16. The improvement according to claim 15 wherein each said rack member further defines stop means associated with each said groove for limiting the downstream movement of said shelf members along said gas flow channel.

17. In an electrically excited laser wherein a laser gas is caused to flow along a gas flow channel and through an excitation region of said channel in which an electric discharge is established along a direction transverse to the direction of gas flow and into which an electron beam is introduced along said direction transverse to the direction of gas flow, the improvement comprising:
a plurality of electrically insulating rack members disposed across said gas flow channel adjacent to the downstream end of said excitation region along a direction parallel to the direction of said discharge, a first series of planar shelf members carried by said rack members and aligned with one another in a first plane transverse to the direction of said discharge, and a second series of planar shelf members carried by said rack members and aligned with one another in a second plane parallel to said first plane and spaced therefrom along the direction of said discharge, said first and second series of said shelf members extending across said gas flow channel and each of said shelf members having its upstream edge located approximately at the downstream end of said excitation region.

* * * * *